(12) United States Patent
Hewlett et al.

(10) Patent No.: US 6,898,019 B2
(45) Date of Patent: May 24, 2005

(54) PULSE WIDTH MODULATION SEQUENCE GENERATION

(75) Inventors: Gregory J. Hewlett, Richardson, TX (US); Donald B. Doherty, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/779,240

(22) Filed: Feb. 13, 2004

(65) Prior Publication Data

US 2004/0160656 A1 Aug. 19, 2004

Related U.S. Application Data

(62) Division of application No. 10/335,313, filed on Dec. 31, 2002.
(60) Provisional application No. 60/345,702, filed on Dec. 31, 2001.

(51) Int. Cl.[7] .................................................. G02B 27/00
(52) U.S. Cl. ........................................ 359/634; 353/84
(58) Field of Search ................................ 359/634, 618, 359/237; 353/84, 82, 28, 29, 30, 31, 32

(56) References Cited

U.S. PATENT DOCUMENTS

| | | | |
|---|---|---|---|
| 3,256,385 A | 6/1966 | Miller | |
| 3,748,035 A | 7/1973 | Mannik | |
| 4,415,931 A | 11/1983 | Dischert | |
| 4,739,396 A | 4/1988 | Hyatt | |
| 2,933,554 A | 4/1990 | Fredendall | |
| 5,410,370 A | 4/1995 | Janssen | |
| 5,416,514 A | 5/1995 | Janssen et al. | |
| 5,508,738 A | 4/1996 | Janssen et al. | |
| 5,528,318 A | 6/1996 | Janssen | |
| 5,532,763 A | 7/1996 | Janssen et al. | |
| 5,548,347 A | 8/1996 | Melnik et al. | |
| 5,608,467 A | 3/1997 | Janssen et al. | |
| 5,684,504 A | 11/1997 | Verhulst et al. | |
| 5,781,251 A | 7/1998 | Otto | |
| 5,845,981 A | 12/1998 | Bradley | |
| 6,097,456 A | 8/2000 | Wang | |
| 6,266,105 B1 | 7/2001 | Gleckman | |
| 6,361,172 B1 | 3/2002 | Brennesholtz | |
| 6,574,046 B1 * | 6/2003 | Shioya | ........................ 359/618 |
| 6,591,022 B2 | 7/2003 | Dewald | |
| 6,642,969 B2 | 11/2003 | Tew | |
| 6,702,446 B2 * | 3/2004 | De Vaan et al. | ............... 353/84 |
| 6,771,325 B1 | 8/2004 | Dewald | |
| 2001/0008470 A1 | 7/2001 | Dewald | |
| 2003/0020839 A1 | 1/2003 | Dewald | |

* cited by examiner

Primary Examiner—Hung Xuan Dang
(74) Attorney, Agent, or Firm—Charles A. Brill; Wade James Brady, III; Frederick J. Telecky, Jr.

(57) ABSTRACT

An electronic method for addressing and synchronizing a spatial light modulator (SLM) device when used with color scrolling recovery (SCR) illumination. This method applies all the colors to a single SLM simultaneously and recaptures secondary light, redirecting it along the primary color paths to significantly improve the brightness in single-chip display applications. The SCR concept requires multiple colors to be imaged on to an SLM array simultaneously. This requires that the SLM be divided into reset groups so that separate groups of pixels can project bits from the different colors at the same time. As these color bands 602, 604, 606 scroll across the array, the various reset groups tracks these regions and change content to match. The method requires that the device be divided and controlled at an independent reset group level, with each group being delayed by a group_ skew time 608 from the previous group. This method assures that all colors are exactly on the SLM at the same time, so that the color mix is the same at all times to assure good color intensities. Finally, the light during the transition time between colors bands, called spokes 1010, is added together as white light that further increases the brightness of the system.

14 Claims, 6 Drawing Sheets

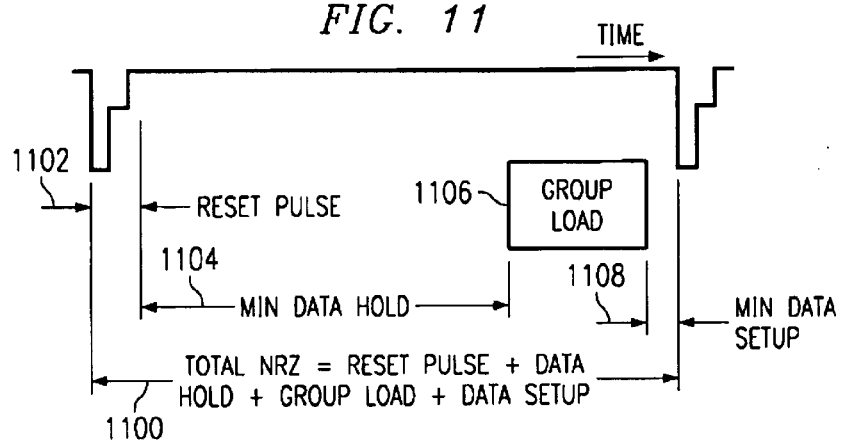
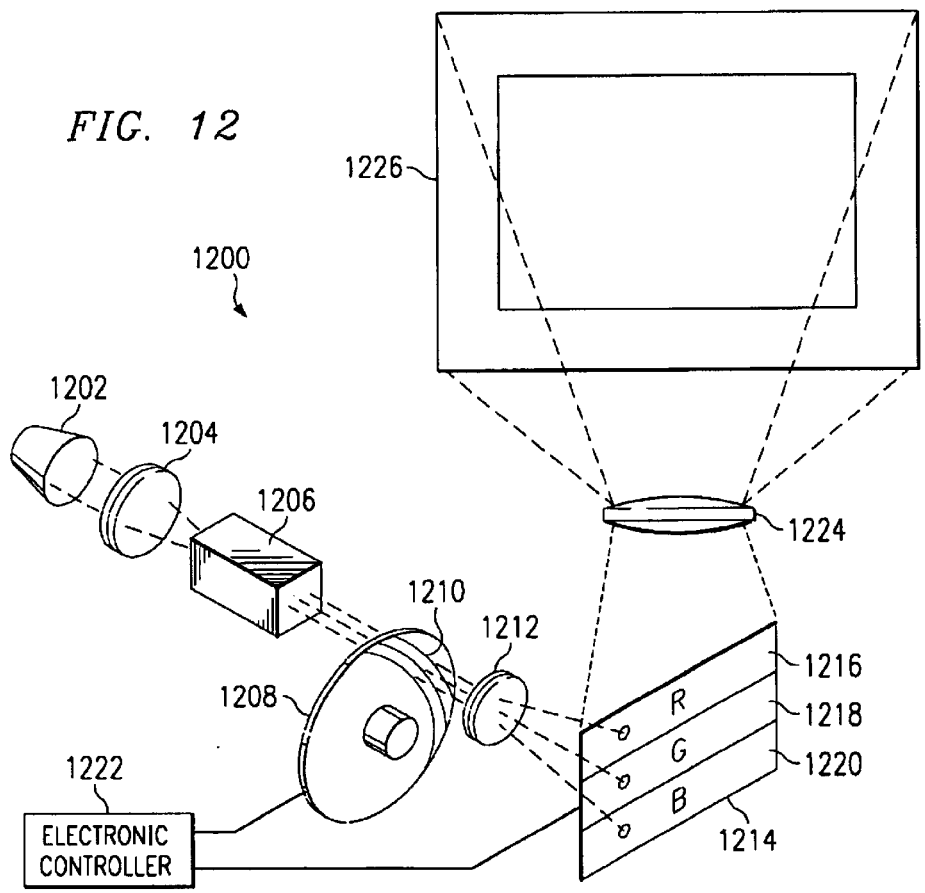

PULSE WIDTH MODULATION SEQUENCE GENERATION

This application is a Divisional of Application No. 10/335,313, filed Dec. 31, 2002 which claims priority under 35 USC §119(e)(1) of Provisional Application No. 60/345,702, filed Dec. 31, 2001.

FIELD OF THE INVENTION

The present invention relates to spatial light modulator (SLM) projection systems and more specifically to the electronic timing method for systems with scrolling color optics.

BACKGROUND OF THE INVENTION

In conventional SLM projection systems, the entire device (modulator) is sequentially exposed to uniform colors for relatively long periods of time, with brief, spatially distributed transition periods between colors, called spokes (in reference to the physical spokes between filters on a color filter wheel), while the pulse width modulation (PWM) process is carried out for each respective color frame. FIG. 1 is an example illustrating this process, where the white illumination is passed through a color filter wheel 100, having red 102, green 104, and blue 106 primary color filter segments, producing sequential red 108, green 110, blue 112, red 114, etc. beams of light that expose the SLM. Other examples can include secondary color filters and/or include a white (clear) filter segment. These relatively long color periods with globally defined temporal boundaries allows the PWM bits to be turned ON and OFF either globally or phased by reset groups over the entire device load time. Since the PWM bits can be thought of as beginning and ending more or less simultaneously over the entire array, the PWM design process could be performed while treating the SLM as a whole, as long as certain design rules were followed.

The traditional PWM design rules developed over the years allowed a designer to size and arrange bit times to enhance performance and to adhere to predetermined bit weights. This meant that the designer could effectively place the resets that turn bits ON and OFF into the video frame timeline with confidence that, if the rules were followed, the loading of device data could be subsequently inserted into the same timeline without conflict. Furthermore, the designer would create one timeline for the entire array, knowing that the design rules would allow time phasing by reset group. However, although this illumination method is quite effective, two-thirds of the illumination is filtered out and lost at the color wheel, limiting the overall brightness of the projector.

With the introduction of the scrolling color recovery (SCR) optics method of illuminating a SLM, illustrated in FIG. 2, the concept of global bits is not longer applicable. This concept produces red 218, green 220, blue 222, and optional white color bands, which scroll across the SLM 216 so that multiple colors are applied to the SLM array simultaneously. This optical system is comprised of a light source 200 that supplies white light 202 to an integrator rod 204, with light from the integrator rod passing through a color filter wheel 206, through a condenser lens 214, on to the SLM 216. The filters are spiral shaped so as to produce three simultaneous red 208, green 210, and blue 212 bands of light. This concept also recovers a portion of the light that is not passed by a color filter segment by reflecting the secondary CYM light 224 back into the integrator rod 204 where it is recovered and sent back as RGB 226 light to the appropriate primary color filters.

Since the nature of the SCR method requires multiple colors to be applied to the SLM array simultaneously, what is needed is an electronic addressing method to accommodate the use of this illumination scheme in SLM devices. The present invention meets this need by dividing and controlling the SLM device at independent reset group levels, which are synchronized with the scrolling color bands. This method displays the bits in such a way the they exactly math the scrolling bands of color across the device and assure that the bits all add up in a way to provide PWM linearity. As a result, this approach provides a significant increase in the brightness in single-SLM projection systems.

SUMMARY OF THE INVENTION

The present invention discloses an electronic method for addressing and synchronizing a single spatial light modulator (SLM) device when used with color scrolling recovery (SCR) illumination. This method applies all the colors to a single SLM simultaneously and recaptures secondary light, redirecting it along the primary color paths to significantly improve the brightness in single-chip display applications. The SCR concept requires multiple colors to be imaged on to an SLM array simultaneously. This requires that the SLM be divided into reset groups so that separate groups of pixels can project bits from the different colors at the same time. As these color bands scroll across the array, the various reset groups track the color bands and change content to match. This requires that the reset boundaries and the color region boundaries be close to parallel, so that a reset group is contained within a color band and the displayed bit represents that color.

The method requires that the device be divided and controlled at an independent reset group level, consisting of color cycles. In operation, bits are constantly loaded in identical sequence in a group-to-group manner, with each group being delayed by a group_skew time from the previous group. This group_skew is computed from the number of groups, the group load time, and the device load time. The load interval for a device is chosen such that a color cycle has an integral multiple of load intervals, where the integral multiple is the number of reset groups plus one. In addition, it requires that there be an integral number of color cycles in a PWM frame. This method assures that all colors are exactly on the SLM simultaneously, assuring that the color mix is the same at all times.

This approach also deals with the transition time between colors bands where the device is exposed to mixed colors. In this case, when multiple colors of light are present on a group, it is said to be a virtual spoke time. However, spoke time light does not have to be discarded, but is added together as white light that can further increase the brightness of the system.

BRIEF DESCRIPTION OF THE DRAWINGS

For a more complete understanding of the present invention, and the advantages thereof, reference is now made to the following descriptions taken in conjunction with the accompanying drawings, in which:

FIG. 11 is a timing diagram defining no-reset-zones for loading a spatial light modulator in a scrolling color system application.

FIG. 12 is a block diagram of a single spatial light modulator projection system, which uses the scrolling color band optics and the electronic addressing and synchronizing scheme of the present invention.

DETAILED DESCRIPTION OF THE PREFERRED EMBODIMENTS

The present invention discloses an electronic method for addressing and synchronizing a spatial light modulator (SLM) device when used with color scrolling recovery (SCR) illumination. This method applies all the colors to a single SLM simultaneously and recaptures secondary light, redirecting it along the primary color paths to significantly improve the brightness in single-chip display applications. This requires that the SLM be divided into reset groups so that separate groups of pixels can project bits from the different colors at the same time. As these color bands, and boundary regions between bands scroll across the array, the various reset groups track the bands and change content to match.

Figure 1:
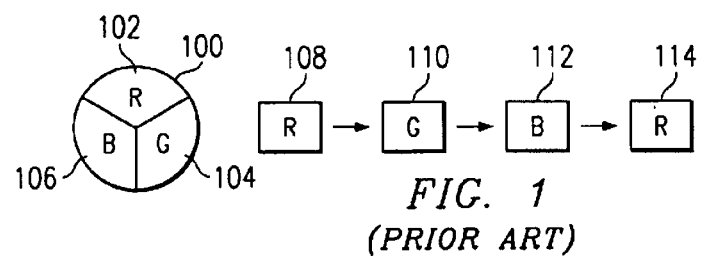
FIG. 1 is a block diagram for a conventional color filter wheel, which sequentially illuminates an entire spatial light modulator with colors.
Figure 2:
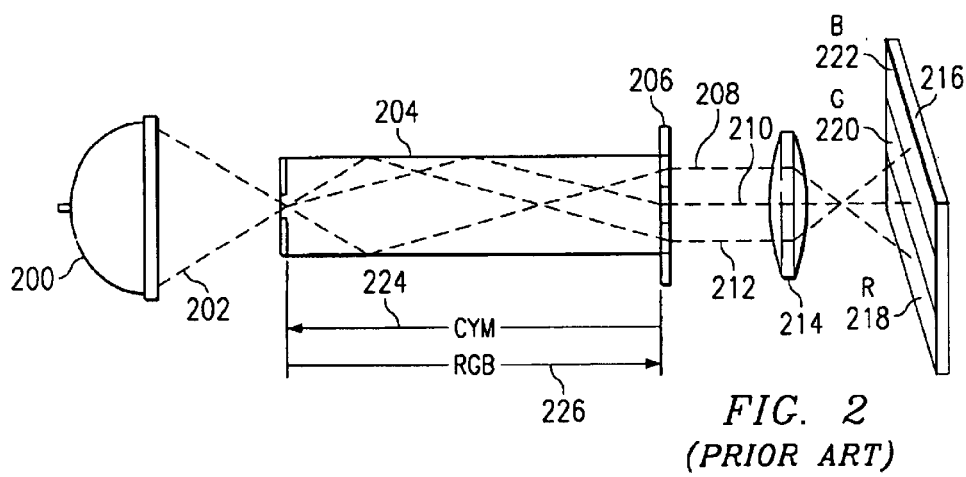
FIG. 2 is a block diagram of an optical system used in the present invention to provide scrolling color bands on a spatial light modulator. This optics recombines a portion of the filtered secondary light and redirects it back into the appropriate primary color band.
Figure 3:
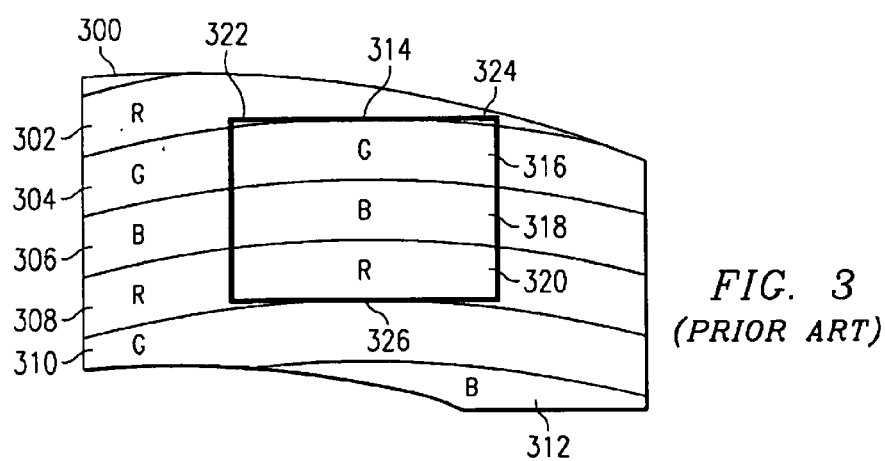
FIG. 3 is an exploded view illustrating how the scrolling color bands used in the present invention are all present on the spatial light modulator simultaneously.

FIG. 3 is a view illustrating how the scrolling color bands used in the present invention are all present on the spatial light modulator simultaneously. The rotating color wheel 300 is made up of color filter segments (red 302, green 304, blue 306, optional white, red 308, green 310, blue 312, and optional white) arranged in the form of an Archimedes spiral, which sweep across an area 314 representing an SLM device. This illustrates how the total of all the colors are present on the device at all times. Since the illumination bands have a slight curvature and the device is rectangular, the colors will be split at the top corners and bottom center of the device. Here a red band 302 is just moving on to the top of the device 314 while a previous green band 310 is moving off the bottom of the device. In this capture view, the blue color 318 is fully contained in blue band 306 in the center of the device, the green color 316 consists of color from the green band 304 at the top of the device and the green band 310 just moving off the center bottom 326 of the device, and the red color 320 consists of colors from the red band 308 at the bottom of the device and the red band 302 at the upper corners 322, 324 of the device.

The SCR method of illuminating an SLM requires that the multiple colors be imaged on the device array simultaneously. This means that at any point in time there is an equal amount of red, green, blue, and optional white light on the surface of the SLM. As a result, this requires that the SLM be divided into reset groups of separately addressed pixels, which can show bits from the different colors at the same time. As the color segments and boundary regions scroll across the array, the various reset groups track these regions and change content to match. It is necessary that the curvature of the color filter segments (bands) and reset group boundaries be made as close as possible to parallel. Otherwise, it would be difficult for a reset group to be completely contained within a color region and thus could never show a bit for that color.

Figure 4A:
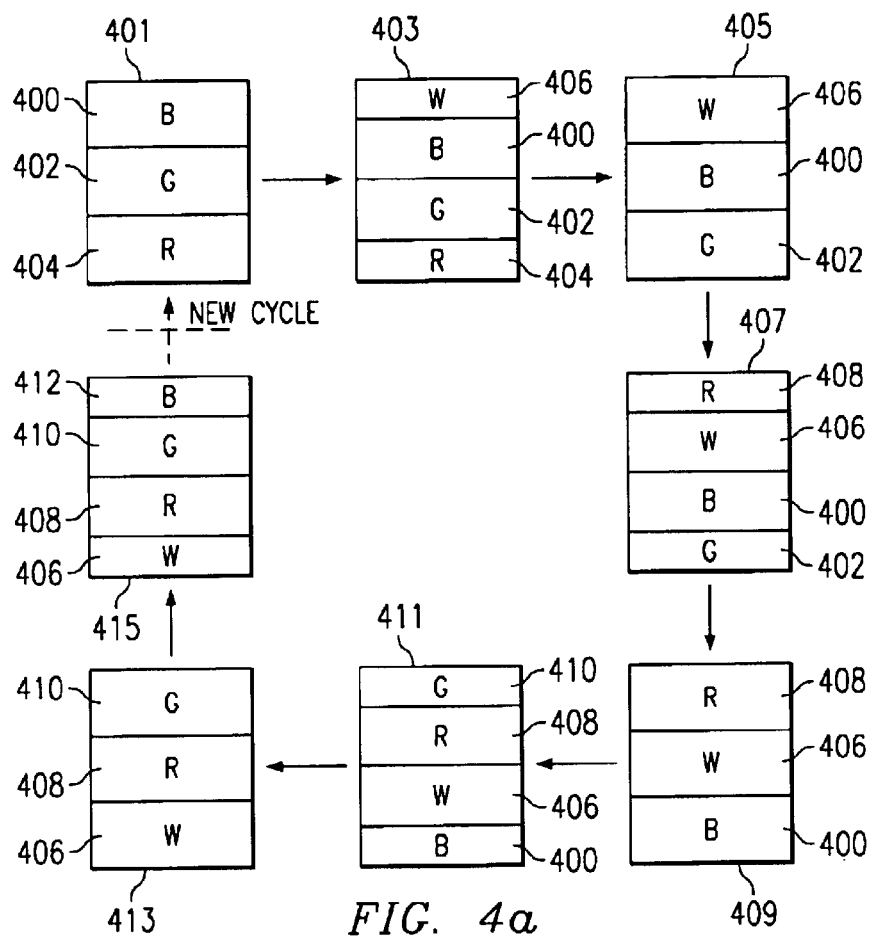
FIG. 4a is a drawing illustrating the need to have all light of each color on the spatial light modulator surface at all times to prevent intensity changes in the various colors.
Figure 4B:
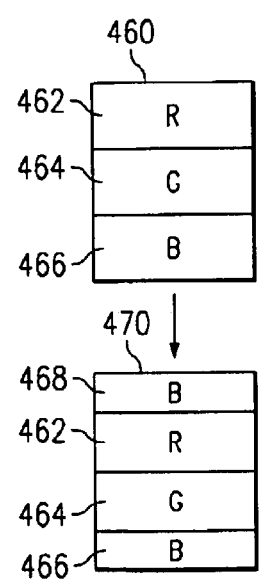
FIGS. 4b and 4c are drawings illustrating how the need to have all light of each color exactly on the spatial light modulator surface at all times is met.
Figure 4C:
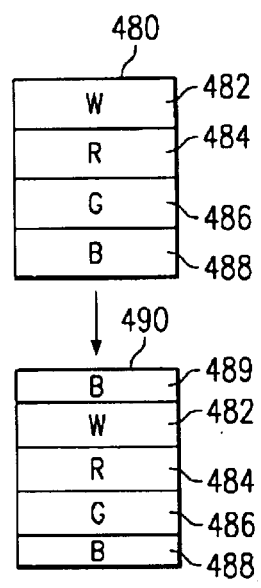

Another aspect of the SCR method is that the recycled light spectrum is a product of the mix of color filter components in the integrator rod's reflection window. If that filter mix is allowed to vary, then the intensity and/or color of the various color regions will also vary, which is unacceptable. An example of this is shown in FIG. 4a. Here, the color filter is producing red, green, blue, and white color bands. First, the SLM device frame 401 is exactly aligned with the blue 400, green 402, and red 404 color bands. As the red band 404 moves off the bottom of the device in frame 403, the white band 406 moves on to the top of the device, so that the red-green-blue color sequence is interrupted by a white band 406 between the red 404 and blue 400 bands. In frame 405 the red band 404 has moved completely off and the white band 406 has move completely on to the device. In frame 407 the green band 402 is moving off the bottom of the device and a new red band 408 is moving on to the top of the device. In frame 409, the device is illuminated with the blue band 400, the white band 406 and the new red band 408. In frame 411 the blue band 400 is moving off the bottom of the device and a new green band 410 is moving on to the top of the device. Continuing, in frame 413 the device is illuminated with the white band 406, red band 408, and the new green band 410. In frame 415 the white band 406 is moving off the bottom of the device and a new blue band 412 is moving on to the top of the device. Finally, the cycle repeats with new red 408, new green 410, and new blue 412 bands exactly illuminating the device. However, as the white segment scrolls on to, across (down), and off of the device, the intensities of the red, green, and blue colors go up and down while the color of the white segment takes on various shades of color. All the changes happen gradually as the color bands move down the device, thereby preventing any reset group from obtaining uniform light. This can cause observable artifacts in the image. For example, in frame 403 where there is less red light, the blue 400 and green 402 intensities go down and the white band 406 takes on a redish shade. In frame 405 where the red band has moved completely off the device, the blue 400 and green 402 intensities are further down and the white band has more red color content. Similarly, the intensities vary up and down and the white segment takes on greenish and blueish shades in frames 409, 411 and 413, 415, respectively. As a result, the SCR method requires that the color filter mix be constant;

i.e., whatever color is scrolling off one edge of the array must be simultaneously scrolling on to the opposite edge of the array, as is illustrated in FIGS. 4b and 4c.

FIGS. 4b and 4c are drawings illustrating cases where the need to have all light of each color on the spatial light modulator surface at all times is met. In FIG. 4b, frame 460 consists of red 462, green 464, and blue 466 color bands, exactly aligned with the device. As the bands moves down the device in frame 470, as the blue band 466 moves off the bottom of the device, a new blue band 468 enters at the top of the device, so that there is always exactly the same mix of red, green, and blue light on the device. In the case where a white band is added, the frame 480 consists of white 482, red 484, green 486, and blue 488 color bands, exactly aligned with the device. Again, as the bands moves down the device in frame 490, as the blue band 488 moves off the bottom of the device, a new blue band 489 enters at the top of the device, so that there is always exactly the same mix of red, green, blue, and white light on the device.

As mentioned earlier, the SCR method of the present invention requires that the SLM be divided into reset groups with boundaries more or less parallel to the color band boundaries that move down the device. Anytime the projection of a color band is certain to encompass an entire reset group that reset group can display data for the encompassing color bits. However, anytime a reset group has mixed colors, or might have mixed colors due to some system uncertainty, then that group cannot display data from a single color and is said to be in a virtual spoke. There are no physical spokes as in the case of a conventional rotating color filter wheel, thus the name virtual spoke. The light incident on a reset group during a spoke period is variable both spatially, due to the color difference on the opposite sides of the boundary, and temporally, since the boundary is moving.

Fortunately, light during the virtual spoke time does not have to be discarded.

Using spoke light recapture techniques developed for traditional SLM systems, these spoke times can be combined in a way such that the total integrated light on the reset group is uniform and treated as white light. This is true even thought the contribution of individual spokes is generally non-uniform on different pixels within a reset group. So the pulse width modulation software must display white data bits during spokes times and show individual color data only while a rest group's incident light is uniform. Since all spoke time must be treated as white, the duration of the spokes directly affects how much light can be used for saturated color intensity, but has no effect on total white intensity.

Figure 5:
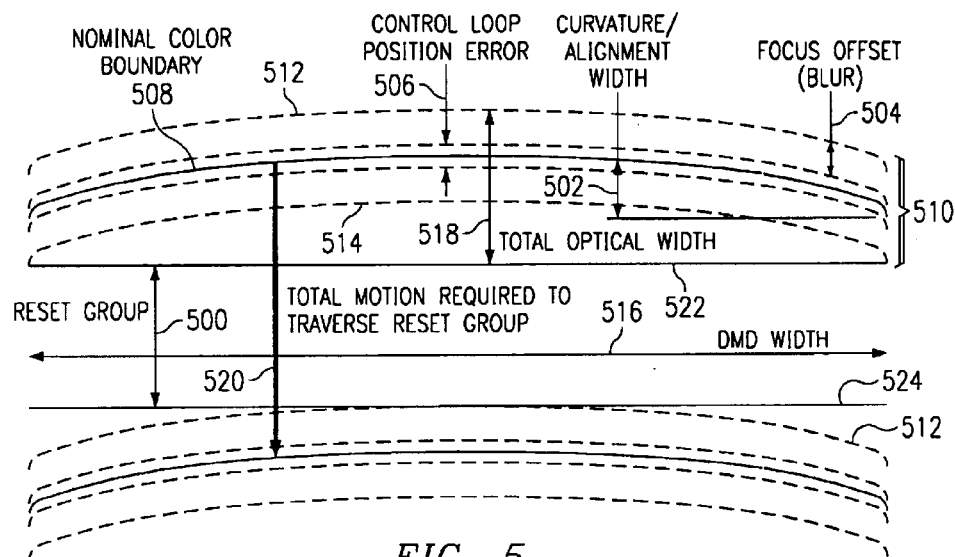
FIG. 5 is a diagram that illustrates the traverse time for a scrolling color virtual spoke width component.

The length of time devoted to spokes has several components as shown in FIG. 5. This shows the case for top-to-bottom scrolling with the components being grouped into architectural and optical classes. The architectural component is simply the height of the reset group 500. The optical components consist of the curvature and alignment width 502 of the color boundary as imaged on the SLM, the focus blur 504, and the position error 506 in the color wheel control loop around the nominal color boundary 508. All the optical components put together comprise a band 510, having an upper boundary 512 and a lower boundary 514 extending across the width 516 of the SLM, in which the color can be spatially non-uniform. The total optical width 518 is the distance in the center of the band, taking the curvature into account, from the lowest point of the lower boundary 514 to the highest point of the upper boundary 512. The total spoke time 520 is then the time it takes for this optical band to move all the way across the reset group 500.

In other words, the spoke time begins when the leading edge 514 of the optical band 510 reaches the top edge 522 of the reset group 500 and ends when the trailing edge 512 reaches the bottom edge 524 of the reset group 500.

As discussed earlier, since the mix on the device must be held constant, the color sequence on any pixel must be a repeating string, such as RGBRGBRGB or RGBWRGBWRGBW, where one repetition of this string represents a color cycle. For pulse width modulation purposes, a color cycle includes both the color bands and the pokes between colors. In the SCR method, each reset group is exposed to the same color cycle except that the cycle is offset in time from every other reset group. This offset in time between color cycles in one reset group and the color cycles of an adjacent reset group is called the group_skew. The concept of color cycle and group_skew are illustrated in the timing diagram of FIG. 6. This shows approximately one-third of a progressive TV frame 600 (approximately $\frac{1}{180}$ sec) with 16 reset group (numbered 0 to 15), the red 602, green 604, and blue 606 color bands (shaded), and the group_skew time 608. Each reset group receives the same color cycle but delayed in time by the group_skew time. For example, the red color band 610 in reset group 1 is delayed by the group_skew time 612 from the red color band 602 in the previous reset group 0, etc.

The actual time occupied by one color cycle is inversely proportional to the rotational speed of the color filter wheel. Assuming equivalent control loop performance for the color wheel at different speeds, the percentages of the color cycle taken up by the individual colors, virtual spokes, and group_skew do not change with varying color cycle length. The cycle length can therefore be optimized without affecting overall color content.

An additional restriction on the color cycle length is that the cycles must fit exactly into PWM frames. One PWM frame is one cycle through the PWM program, where all the bit are modulated and integrated together to make up a perceptible picture. In order to make the PWM display consistent, each frame must contain an integral number of color cycles. The PWM designer must therefore select a color cycle period equal to an integral fraction of the PWM frame time.

Figure 6:
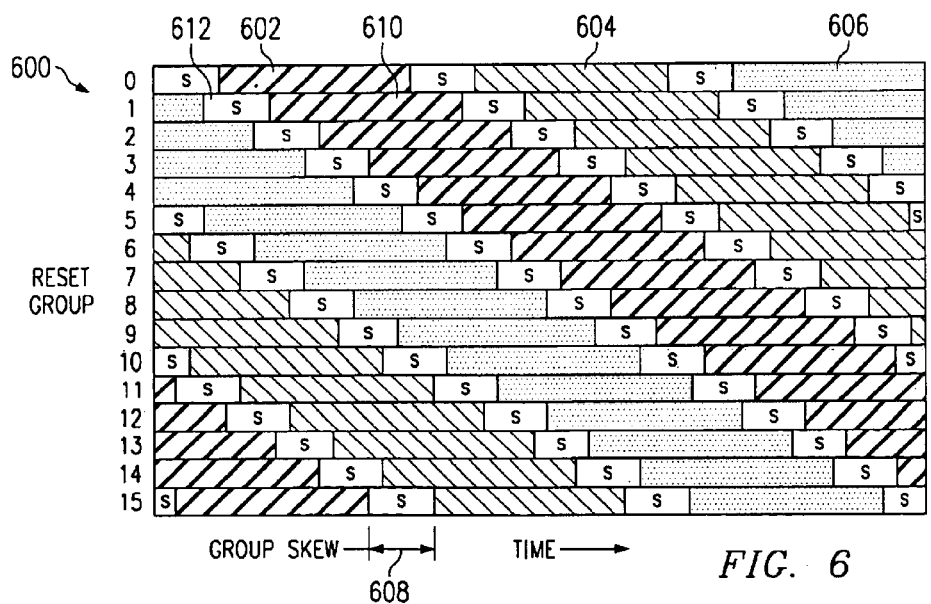
FIG. 6 is a timing diagram illustrating how the spatial light modulator is divided into multiple reset groups.

The length of the group_skew time is a critical factor in the visibility of a type of PWM artifact. When the time difference between the same significant bit being displayed on adjacent reset groups becomes large enough, a viewer can see a temporal anomaly while moving the viewing focus across the group boundary. This phenomenon is caused by a mis-integration of light from two different PWM patterns during the brief period of eye motion. Based on measurements and the state of the technology, it is prudent to limit these reset group time differences to approximately 100 $\mu$sec with current technology. This restriction has two implications:

1) The maximum group_skew time 608, shown in FIG. 6, must be held to approximately 100 $\mu$sec, and
2) The PWM bit sequence displayed during a frame must be the same for every reset group.

The latter ensures that the difference in time for any bits of the same significance in any two adjacent reset groups is the same and that this difference in time is equal to the group_skew time. The PWM program must therefore execute resets in each reset group, offset in time by the group_skew time from the adjacent reset groups. The offset applies not only to the resets that begin and end each color or spoke, but also to any intermediate resets that divide colors into bit times.

With traditional PWM and phased reset timing, adjacent reset groups are typically offset from each other by the time required to load data into one group. This time is usually less the 30 µsec. However, in the example of FIG. 6 a significant bit cannot be activated consecutively over all reset groups. For example, while the initial red bit 602 is being turned on as the red band scrolls down the array, other reset groups are activating green, blue, spoke, and even other significant red bits. Since all the data for these other bits must also be loaded, the first red bit data load must be separated in time to avoid conflicts. This separation extends the red bit spacing and thus the group_skew time to many times what is required for one group load. The relationship of the group_skew (S) to the color cycle is:

$$S = C/G, \text{ and} \quad (1)$$

$C=S*G$, where C is the length of the color cycle and G is the number of reset groups. For example, in order to meet the group_skew requirement of 100 µsecs, the color cycle length should be no longer than 1600 µsec for a SLM with 16 reset groups.

With conventional PWM, the designer distributes resets into the frame timeline to produce the desired bit times and order. By adhering to certain rules, the associated data loads can be inserted later without conflict. In addition, the group loads for each PWM bit are guaranteed to be contiguous and in reset group order, thereby simplifying memory access hardware design. However, as discussed earlier, SCR PWM bits must be displayed and thus loaded in some interleaved manner to enable simultaneous display of multiple bits on different reset groups. This new scenario must be accommodated in the SCR sequence design process.

Figure 7:
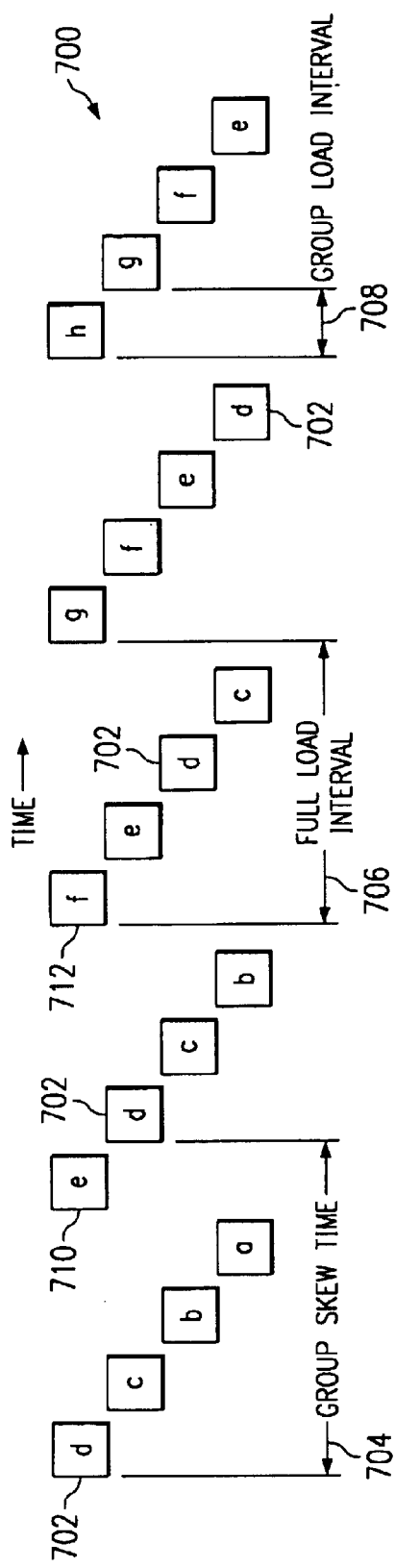
FIG. 7 is timing diagram illustrating how bit-data is loading into a spatial light modulator for a scrolling color system.

Even though SCR PWM could load groups randomly, to be effective for use with existing SLM devices, reset group-order data loading is used. The solution to meeting the group-order requirement and the bit interleave requirement is to mandate sequential group loading cycles with different PWM bits. FIG. 7 is a timing diagram 700 illustrating how these requirements for bit-data loading in a spatial light modulator using SCR is satisfied. By delaying the loading of the same PWM bit (example bit d) 702 on one reset group from the previous reset group by the group_skew time 704, the loading of that data bit 702 occupies the same position in the timeline in every reset group; i.e., between bits c and e. In order to keep the group_skew relationship and also load the reset groups sequentially, the time between full load starts (full load interval) 706 must be slightly shorter than the group_skew time 704 and must be regularly spaced in time. Conversely, the time delay from group load 708 to group load (group load interval) must also be fixed. However, this strictly limits the latitude of placing data loads in the timeline.

An important relationship derived from FIG. 7 is $$S = L_F + L_G, \quad (2)$$

where $L_F$ is the full load interval 706 and $L_G$ is the group load interval 708.

Solving the equation for $L_F$ and substituting from equation (1)

$$L_F = (C/G) - L_G, \text{ and} \quad (3)$$

$$C = S*G = G(L_F + L_G).$$

The fact that data loading with SCR has to be carried out on a fixed and regular time schedule is a significant change from the traditional PWM approach. Currently, loads happen when necessary and there can be long periods of idle time for long bits. But with the SCR method of this invention, the sequence program must at least account for the time where a group load would not ordinarily be needed. For example, in FIG. 7 if the load bit e 710 is not required because the bit pattern called for a long bit time, the program must still do something to advance the SLM row address between group loads bit f 712 and bit d 702. In this case, the program could simply reload the previous bit for that group (in this example bit d 702) or a "dummy" loading mode could be used where the row address advances but no data is loaded.

Another critical point relative to the SCR method is that data load can no longer be inserted into the timeline after all the bit lengths and order have been determined. Instead, the bit times must now accommodate the data loading. This changes the PWM design process so that designers might insert resets where they can, combine bit times into significant bit weights, and then feed that (non-binary) weighting scheme back into data processing and degamma designs.

Figure 8:
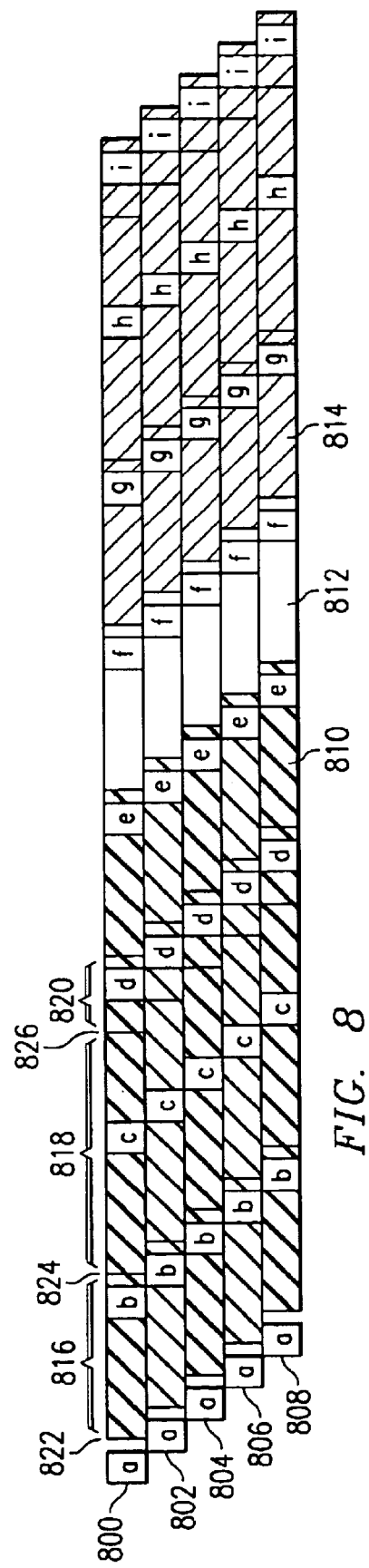
FIG. 8 is a timing diagram for a loads-first color scrolling approach illustrating equidistant device load times, which is equal to the group_skew time.
Figure 9:
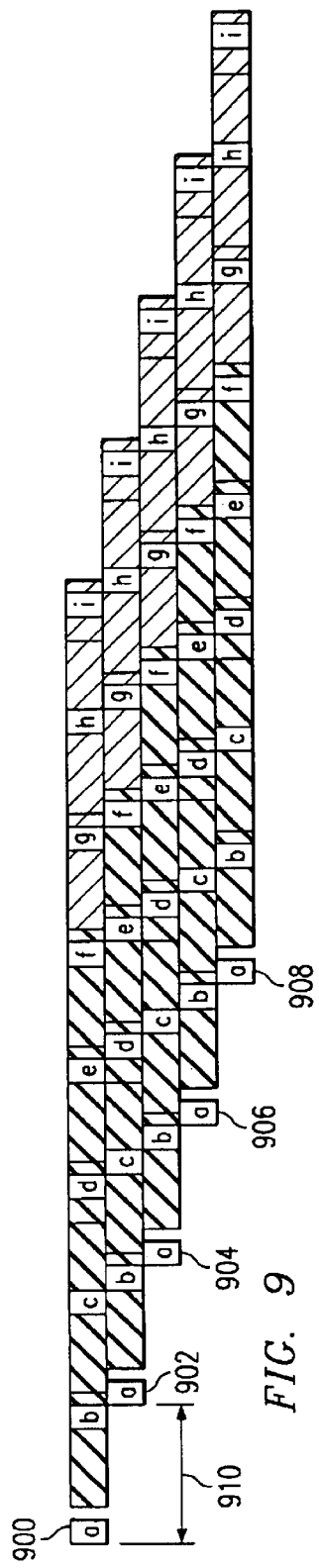
FIG. 9 is a timing diagram showing each reset group in FIG. 8 being delayed the group_skew time, making all the device loads line up and thereby avoiding memory conflicts.

The method for generating a sequence in the SCR method of the present invention is more or less backwards from that of conventional PWM methods. In order to assure a linear, continuous light transfer function, the bits are designed into the sequence according to how they fit, so as to avoid conflicts, then bit weights are assigned, and the degamma maps are used to generate the resulting codes. One way of accomplishing this is to prioritize the short bits first, fitting them into the sequence, and then adjacent bit segments are set to what is left over. The method for generating the sequence is as follows:

(1) Determine the color scroll group_skew, (2) Design a sequence as if there were no color scroll involved, as shown in FIG. 8, but rather as if there were a color wheel whose global effect is like that of the color scroll effect on the first block. Thus the color sequence timing of the first color group, called the prototype group, is the same the timing for every block in the entire device. This shows five reset groups 800–808 and two color bands 810, 814 with a spoke 812 between them. For example, each bit consists of a load 800, reset 822, and a data display time 816 until the next bit is reset 824. (This shows reset 832 being further delayed to accommodate a short bit 826), (3) Apply the constraint that each device load must be equidistant by the time of the color scroll group_skew from the previous load. The key to this approach is that the bit lengths are determined by resets, with the constraint that no extra time may be distributed as is the case with conventional PWM techniques, and then the bit-weights 816, 818, 820, extending between resets 822, 824, 826, respectively, are derived within these constraints rather than them being user defined, (4) Next, each reset group is skewed by exactly one color scroll group_skew time 910 as shown in FIG. 9. This makes all the loads 900–908 line up, as shown, retaining the colors bands and avoiding memory conflicts, (5) Then, reset conflicts are dealt with by adjusting bit lengths where necessary until all conflicts are resolved, and (6) Finally, the bit lengths are used with gamma table codes to derive the various linear light output levels.

Figure 10:
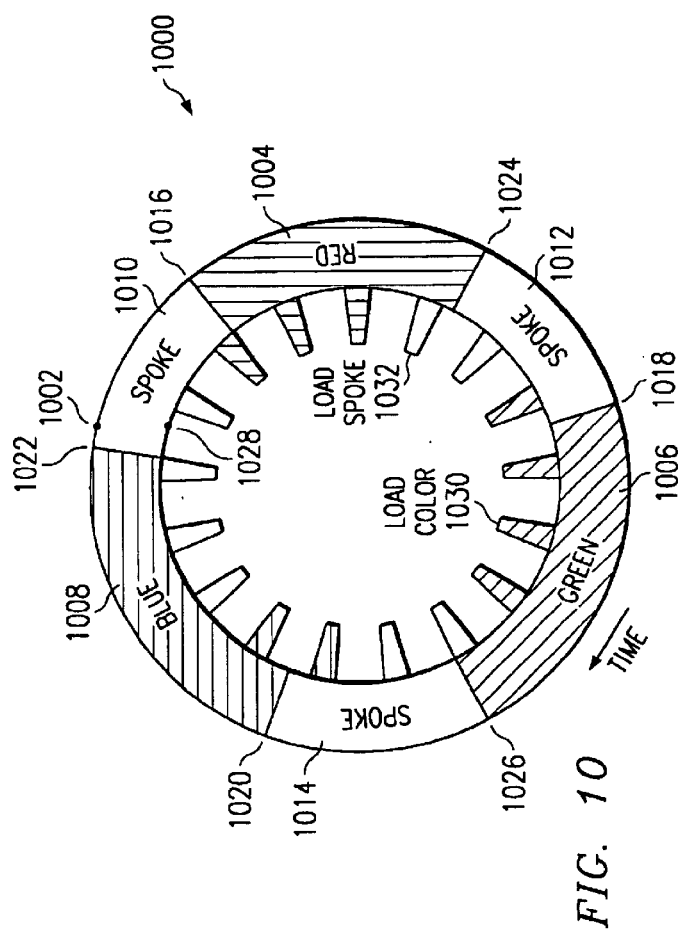
FIG. 10 is a color cycle template for the SCR method of the present invention, showing the color and virtual spoke bands, and the load times for a spatial light modulator in a scrolling color system application.

FIG. 10 is a color cycle template 1000 for the SCR method of the present invention, showing the color and virtual spoke bands, and the load times for a spatial light modulator in a scrolling color system application. In this diagram the outer circle 1002 shows the color 1004, 1006, 1008 and spoke 1010, 1012, 1014 boundaries for the prototype group and thus the placement of the required reset times 1016, 1018, 1020 and 1022, 1024, 1026, respectively, with no reset conflicts. The inner circle 1028 shows the 17 (for 16 reset groups) group loads for each color cycle. These include color loads 1030 and spoke time loads 1032.

Within each reset group, there is a period of time associated with each group load when no resets are allowed. These are called no-reset zones (NRZ) and are defined as shown in FIG. 11. This NRZ is a fixed time before, during, and after each group load. The total NRZ 1100 is made up of the reset pulse time 1102, the data hold time 1104, the group load time 1106, and the data setup time 1108. These times are only dependent on the system and the four SLM parameters 1102–1108 and not on the color cycle period or frame rate. Also, since the group NRZ applies only to resets in the same group, a load does not generate any imputed NRZ's from other reset groups. In other words, each load results in only one NRZ and since all loads occupy the same relative time slot in each reset group timeline, the group NRZ's can be considered in the prototype group, thereby allowing a single prototype group timeline to be designed and applied to all reset groups. For meeting the requirements for SCR operation, the inner 1028 and outer 1002 circles of FIG. 10 are rotated with respect to each other until a solution is found where none of the required resets line up inside a no reset zone.

FIG. 12 is a block diagram of a projection display with scrolling color optics, which incorporates the PWM sequence generation method of the present invention. In this system 1200, a white light from a light source 1202 is coupled through condensing optics 1204, through an integrator rod 1206, and focused on to the surface of a rotating color wheel 1208, which has a set of color filters arranged in the form of an Archimedes spiral 1210. Red 1216, green 1218, blue 1220 (and optional white) bands of light coming through the color wheel are then coupled through relay optics 12 12 on to the surface of an SLM 1214. The system's electronic controller 1222 controls and synchronizes pulse width modulation timing of the SLM and the filter wheel rotation so that there is exactly all the colors present on the surface of the device at all times. Modulated light from the ON pixels of the device is then reflected through a projection lens 1224 on to a display screen 1226. This means that at any point in time there is an equal amount of red, green, blue, and optional white light on the surface of the SLM. In operation, the SLM is divided into reset groups of separately addressed pixels, which can simultaneously show bits from the different colors. As the color segments and boundary regions scroll across the array, the various reset groups track these regions and change content to match. The reset group boundaries and the color band boundaries are made to closely match so that the various image bits can be displayed for each color in such a way as to assure PWM linearity.

This method applies all the colors to a single SLM simultaneously and recaptures a portion of the secondary light, redirecting it along the primary color paths to significantly improve the brightness in single-chip display applications.

While this invention has been described in the context of a preferred embodiment, it will be apparent to those skilled in the art that the present invention may be modified in numerous ways and may assume embodiments other than that specifically set out and described above. Accordingly, it is intended by the appended claims to cover all modifications of the invention that fall within the true spirit and scope of the invention.

What is claimed is:

1. A single-chip spatial light modulator display system, comprising:
   a light source for producing a beam of light along a first light path;
   condensing optics in said first light path to focus said light into an integrator rod;
   said integrator rod collecting and focusing said light to a small spot at the surface of a rotating color filter wheel;
   said color wheel filtering said light into contiguous color bands, said color bands being propagated along said first light path into relay optics;
   said relay optics shaping and focusing said color illumination bands on to the surface of an spatial light modulator, said spatial light modulator modulating said color light and projecting said light along a second light path, said projected light being focused on to a display screen; and
   an electronic controller for synchronizing said color band illumination with said spatial light modulator addressing scheme for producing a highly efficient projection system while using a single spatial light modulator.

2. The system of claim 1, wherein all colors of illumination are simultaneously applied to the surface of said spatial light modulator.

3. The system of claim 1, wherein reflected secondary light from said color filter wheel is recombined in said integrator rod and redirected along primary light paths, thereby significantly improving the brightness of said system.

4. The system of claim 1, said electronic controller synchronizes said color bands to provide exactly a constant amount of each color light on said device at all times.

5. The system of claim 1, wherein said electronic controller divides said device into independent reset groups.

6. The system of claim 1, wherein said synchronizing said color band illumination comprises:
   loading bits in a group-by-group contiguous manner by means of delaying the loading of each said group by a group_skew time; and
   providing an equal number of full-loads per said color cycle.

7. The system of claim 1, wherein said group_skew time is determined by the relationship:

group_skew=length of color cycle÷number of reset groups; and said group_skew being no more than 100 μsec in length.

8. The system of claim 1, wherein the same timing sequence is established for each said reset group, each group being delayed by said group_skew from the previous group.

9. The system of claim 1, wherein a bit-load interval is chosen such that a color cycle consists of an integral multiple of load intervals, said integral multiple being one more than the number of reset groups.

10. The system of claim 1, wherein an integral number of color cycles is provided in each pulse width modulation frame, said color cycle being a repetitive sequence of colors for a given pixel.

11. The system of claim 1, wherein reset group boundaries are approximately parallel to said scrolling color band boundaries.

12. The system of claim 1, wherein a virtual spoke bit is provided during the transition between said color bands, said spoke time being the time required to scroll a color band boundary completely across a reset group.

13. The system of claim 1, wherein all said virtual spoke bit colors add to provide white light, thereby further increasing the brightness of said system.

14. The system of claim 1, wherein said spatial light modulator is a digital micromirror device.

* * * * *